Sept. 26, 1933.  H. B. COYLE  1,928,093
SIGNALING SYSTEM
Filed April 11, 1927  7 Sheets-Sheet 1
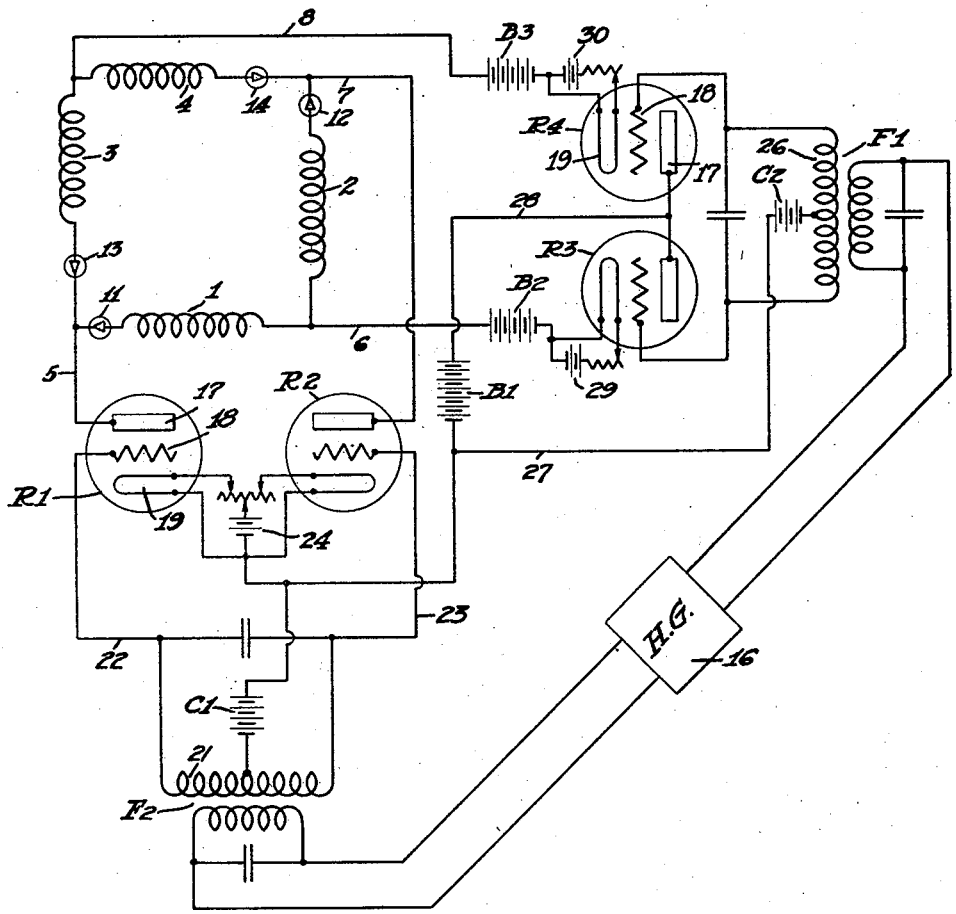
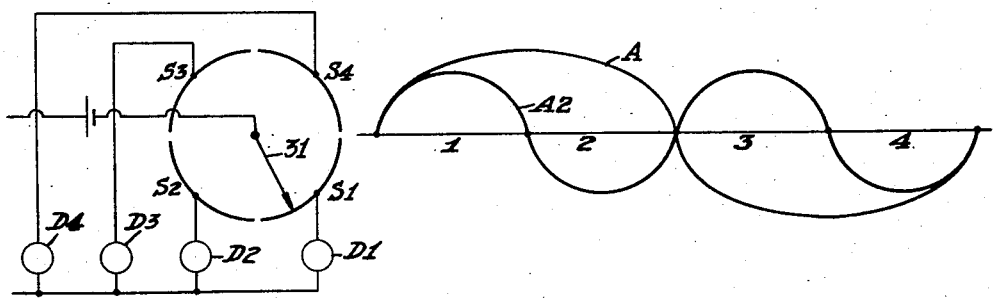
INVENTOR
Harold B. Coyle
BY
his ATTORNEYS Sept. 26, 1933.        H. B. COYLE         1,928,093
                       SIGNALING SYSTEM
               Filed April 11, 1927     7 Sheets-Sheet 2
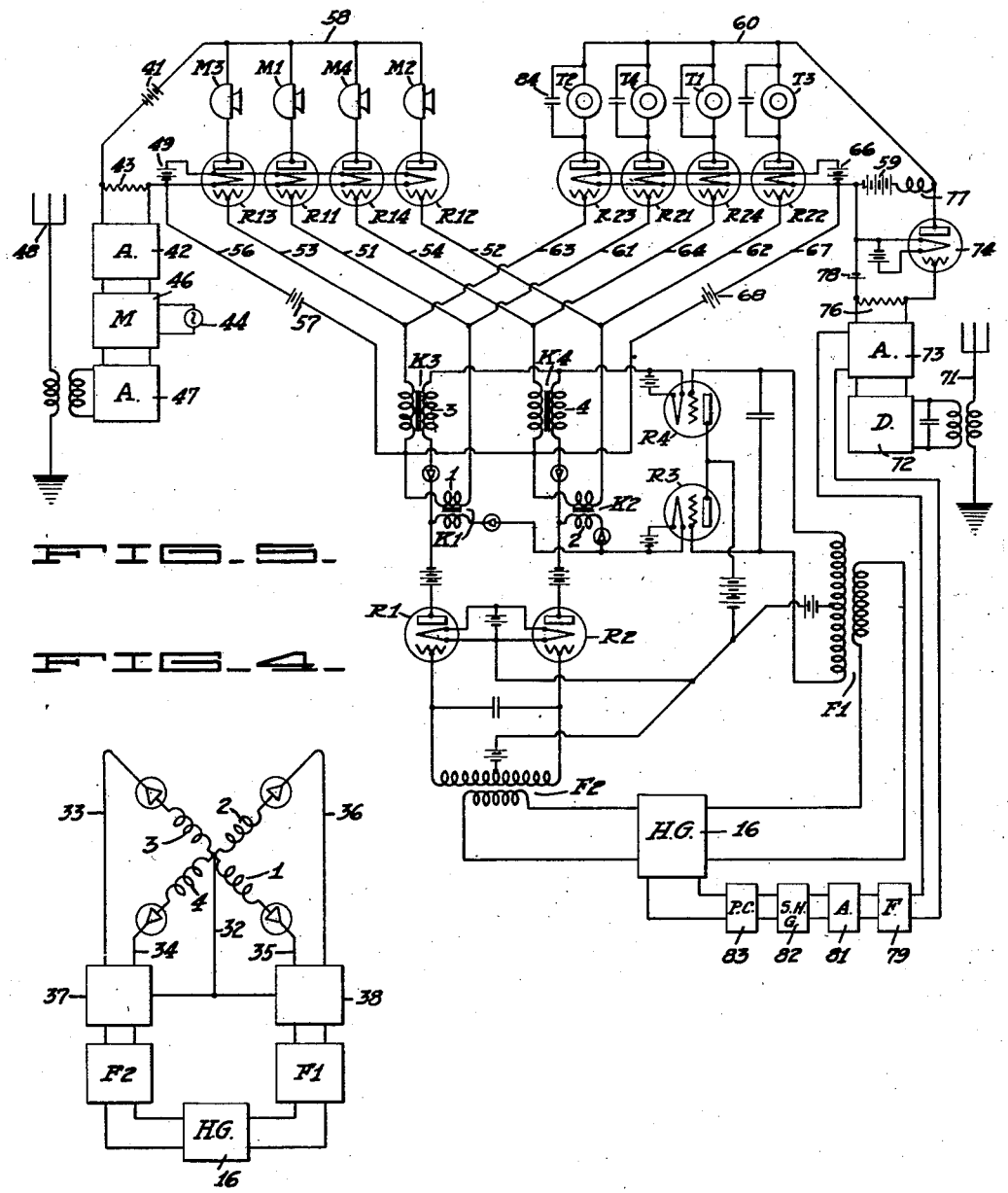
INVENTOR
Harold B. Coyle
BY White, Prept & Fryer
his ATTORNEYS Sept. 26, 1933.   H. B. COYLE   1,928,093
SIGNALING SYSTEM
Filed April 11, 1927   7 Sheets-Sheet 3

INVENTOR
Harold B. Coyle
BY White, Prost & Fryer
his ATTORNEYS

Sept. 26, 1933.  H. B. COYLE  1,928,093
SIGNALING SYSTEM
Filed April 11, 1927   7 Sheets-Sheet 4

INVENTOR
Harold B. Coyle
BY
his ATTORNEYS

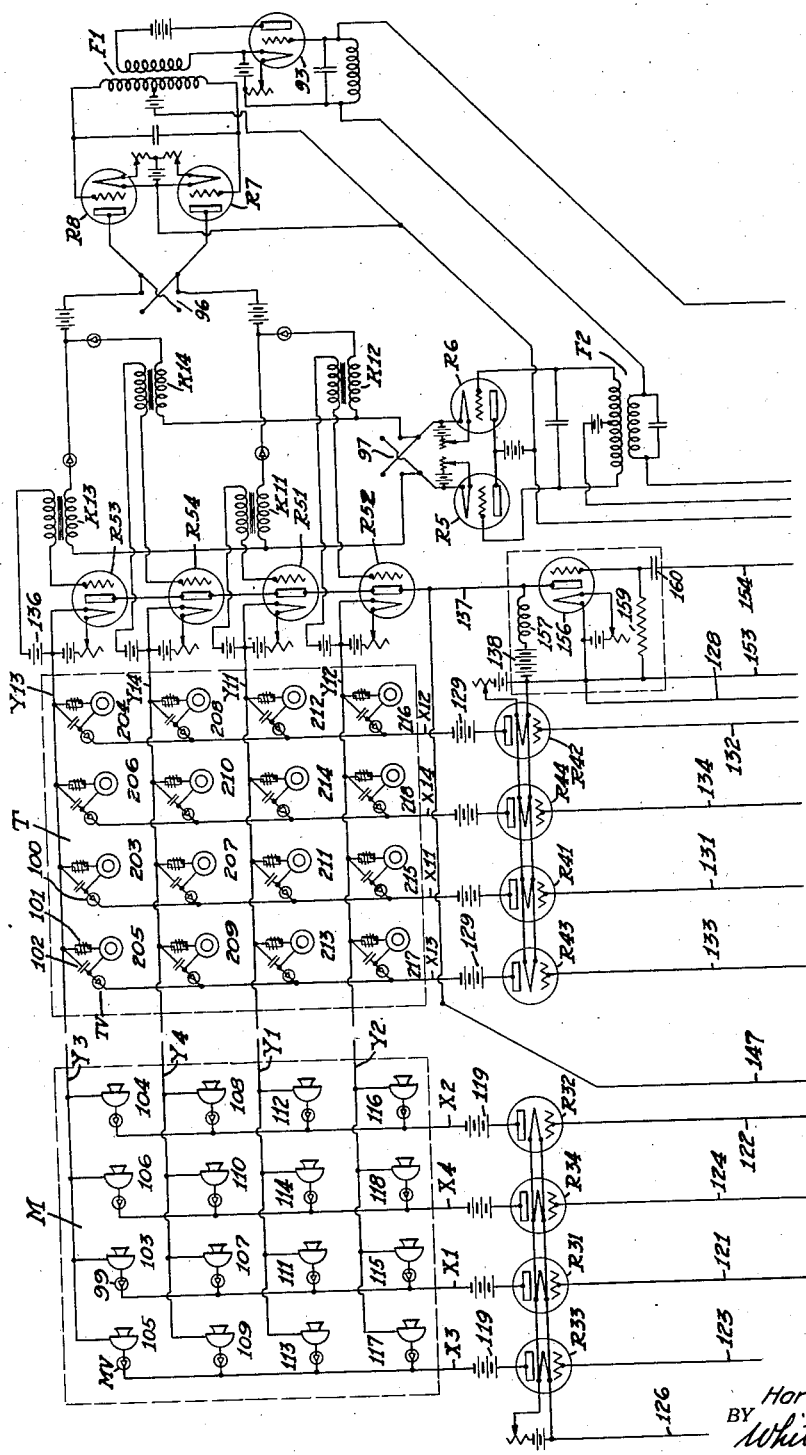

Sept. 26, 1933.  H. B. COYLE  1,928,093
SIGNALING SYSTEM
Filed April 11, 1927   7 Sheets-Sheet 6

INVENTOR
Harold B. Coyle
BY
White, Prest & Fryer
his ATTORNEYS

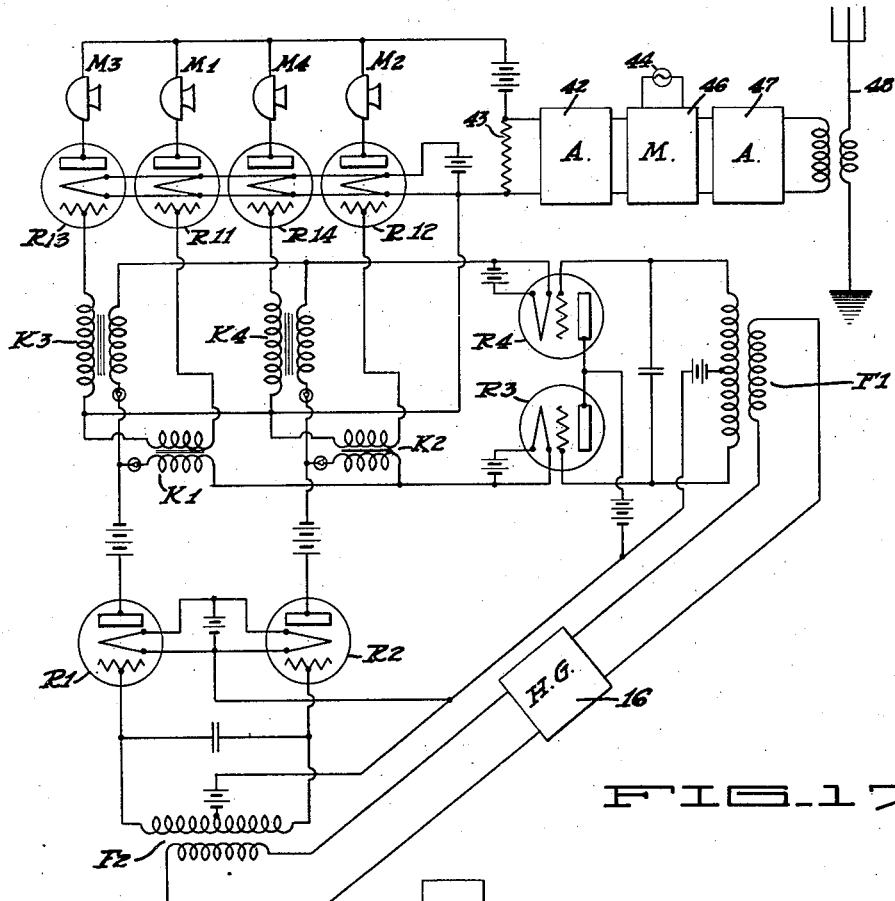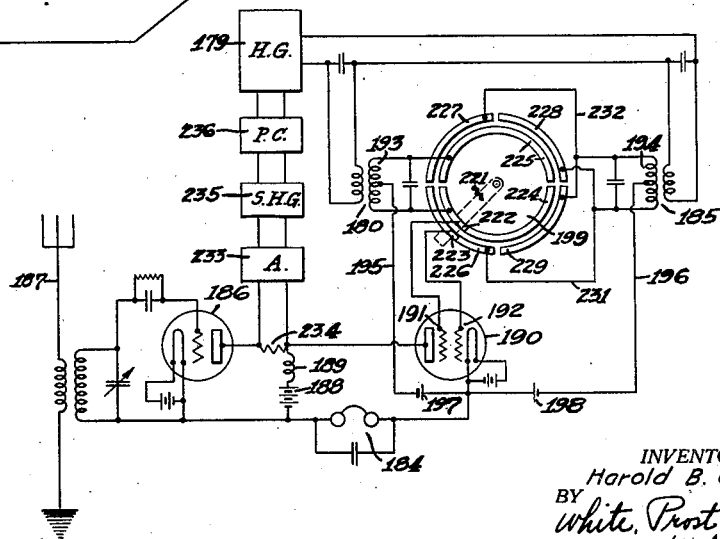

Patented Sept. 26, 1933

1,928,093

UNITED STATES PATENT OFFICE 1,928,093

SIGNALING SYSTEM

Harold B. Coyle, San Francisco, Calif.

Application April 11, 1927. Serial No. 182,620

12 Claims. (Cl. 179—15)

This invention in its preferred form relates to telegraphic and telephonic signaling systems. However a number of distinct and separate inventions are disclosed which are interrelated in that they may be combined to form a complete signaling system.

It is one object of the invention to devise a novel means or method of securing a distribution of electrical energy in a plurality of conducting paths or electrical elements, so that these paths or elements may be energized according to a definite timed relationship.

It is a further object of this invention to devise a novel means and method of securing a distribution of electrical energy in a plurality of electrical elements, which will make use of a plurality of currents bearing a harmonic relationship to each other, the currents being employed to time the energization of the conducting paths or elements.

It is a further object of this invention to devise a system for securing a transfer of energy between two points, the system having separate channels which are distinguished by having distinct timed intervals assigned to each channel. It is a special feature of this system that the time intervals assigned to each channel occur at a rate above audibility.

It is a further object of this invention to devise a novel signaling system which will permit substantially simultaneous transmission of a plurality of signals upon the same carrier frequency.

It is a further object of this invention to devise a novel signaling system which will permit simultaneous transmission of a plurality of signals, each signal being upon a separate channel discriminated from the other channels by being assigned definite successive time intervals, these intervals being assigned by means of a harmonic distributor.

It is a further object of this invention to devise a novel multiplex signaling system which will permit simultaneous transmission and reception over a plurality of separate channels.

It is a further object of this invention to devise a remote control system in which two remote devices are kept in synchronism by means of synchronized harmonic currents.

It is another object of this invention to devise a novel electrical network consisting of a plurality of devices, any one of which may be energized by selecting one conductor from each of two series of conductors.

Further objects of this invention will appear from the following description in which I have set forth the preferred embodiment of my invention. It is to be understood that the appended claims are to be accorded a range of equivalents consistent with the state of the prior art.

Referring to the drawings:

Figure 1 is a circuit diagram illustrating means for effecting a timed distribution of energy in a plurality of electrical elements.

Fig. 2 is a diagram showing a mechanical distributor for explaining the operation of the circuit shown in Fig. 1.

Fig. 3 is a curve illustrating the harmonic currents utilized in the system shown in Fig. 1.

Fig. 4 is a circuit diagram illustrating diagrammatically a modification of the distributing system shown in Fig. 1.

Fig. 5 is a circuit diagram showing a multiplex signaling system incorporating the principles of this invention.

Figs. 6 to 13 inclusive are curves illustrating the operation of the signaling system shown in Fig. 4.

Figure 14B:
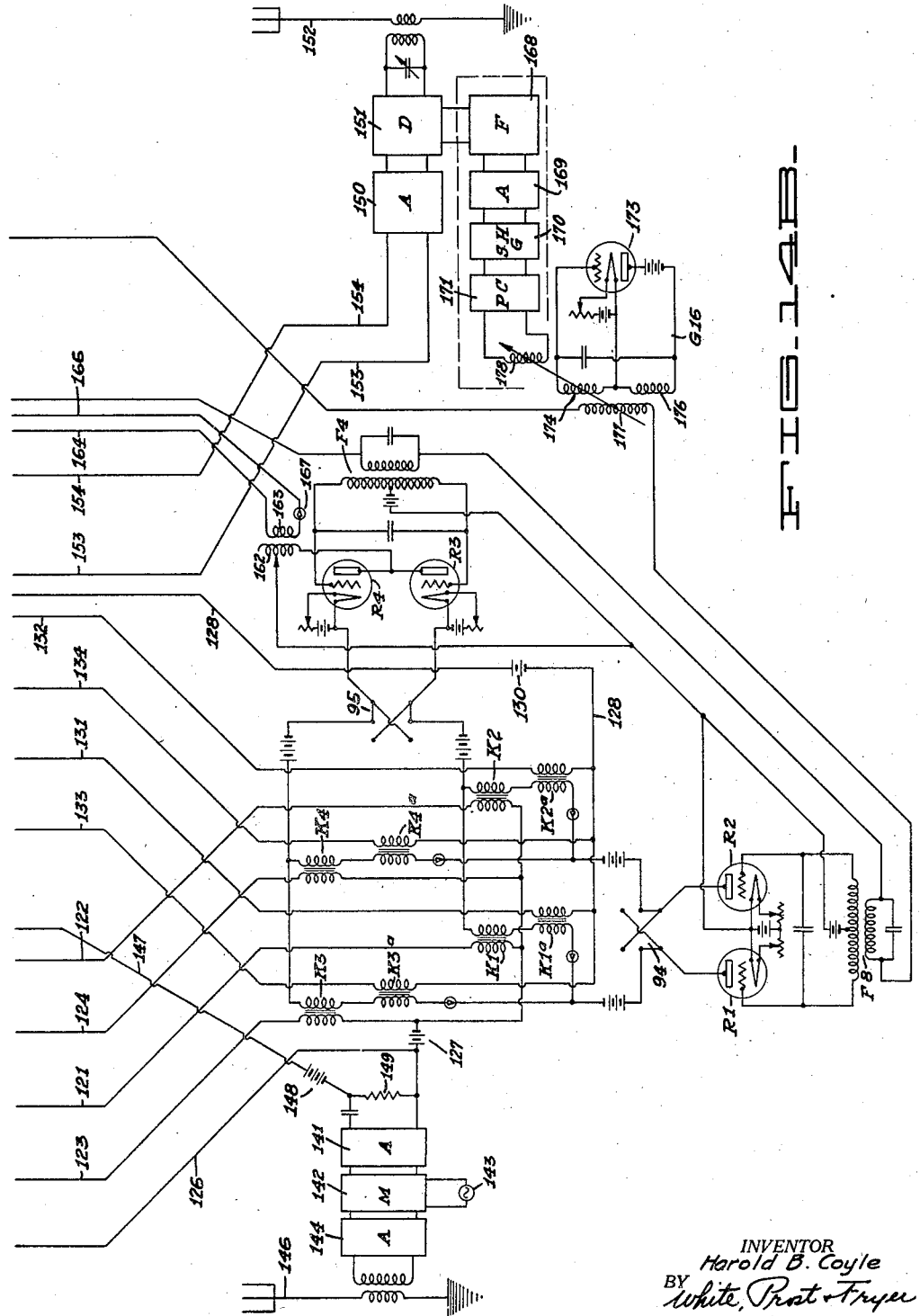

Figs. 14A and 14B are circuit diagrams illustrating a further modification of the signaling system in which a greater number of multiplex signaling channels are provided.

Figure 15:
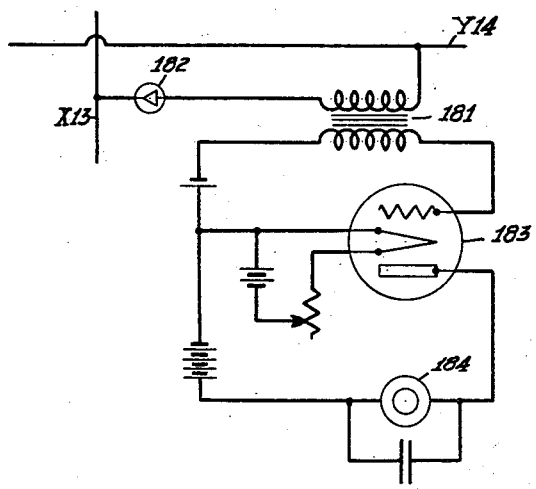

Fig. 15 is a detail showing a modification of the translator network shown in Figs. 14A and 14B.

Figs. 16 and 17 are circuit diagrams illustrating a broadcast signaling system incorporating a multiplex transmitter.

The features of this invention may be outlined briefly as comprising as one of its important features, an electrical distributor for successively energizing a plurality of conducting paths or electrical elements. The timing of these successive impulses is secured by a plurality of currents bearing a definite harmonic relationship to each other. This electrical distributor has been associated with a signal transmitting system, the successive impulses being utilized for assigning successive time intervals for the transmission of separate signal channels. Another electrical distributor is associated with a similar signal receiving system and by synchronizing the distributors, a response at the receiver may be had from any one of the signal channels or from a plurality of channels simultaneously. In certain of the multiplex systems which I have disclosed, I have incorporated the use of novel networks for increasing the effective number of multiplex channels.

Referring first to the electrical distributor which has been shown in detail in Figure 1, I have shown a plurality of inductances 1, 2, 3 and 4 which represent conducting paths or electrical elements to be successively energized. These elements have been shown as inductances in order to facilitate a transfer of energy from the same to parts of another electrical system. However it is obvious that any kind of impedance may be employed, such as a resistance or a capacitance, or these elements may be incorporated as separate electrical circuits. The elements have their terminals electrically connected together to form a group, and to the points of connection are connected the electrical conductors 5, 6, 7, and 8. These conductors are associated with means for energizing successive pairs of conductors;—for example in energizing element 1 a circuit including a source of energy and conductors 5 and 6 is caused to assume finite impedance while the circuits including conductors 7 and 8 assume infinite impedance. In order to limit the flow of current through one element when one pair of conductors is energized, the current through each element is limited to one direction, as by the use of rectifiers or valves 11, 12, 13 and 14 in series with each element 1 to 4 respectively.

The timed energization of successive pairs of conductors 5 to 8 inclusive is secured in this instance by the use of a plurality of currents bearing a definite harmonic relationship to each other. These currents may be generated at different sources although to simplify maintaining the harmonic relationship, they are preferably generated by one source such as the harmonic generator 16. When only four electrical elements are employed the harmonic generator need only produce the fundamental and the second harmonic which are separated out in the filter circuits F1 and F2 respectively. In place of the harmonic generator it is obvious that I may employ an ordinary oscillation generator in combination with a frequency converter. As has been previously explained the currents from the generator 16 serve to time successive impulses in elements 1 to 4, and this timing is effected through the use of suitable relays R1, R2, R3 and R4 which are associated with conductors 5 to 8 respectively. While these relays may be magnetic, they are preferably electronic and may be controlled to vary their impedances between finite and infinite limits. For example each relay may be of the ordinary three element type having a plate or anode 17, grid or control electrode 18 and filament or electron emission element 19.
In the drawings I have shown one specific way in which the electron relays may be electrically connected to be controlled by currents from the harmonic generator 16. Thus the filter F2 has been provided with an output winding 21, to the center tap of which is connected the negative terminal of a "C" battery C1, the positive terminal of which is connected to the filaments 19 of relays R1 and R2. Conductors 22 and 23 serve to connect the terminals of winding 21 to the grids 18 of relays R1 and R2. The filaments 19 of relays R1 and R2 are energized from a suitable source of current such as the "A" battery 24. The filter F1 is likewise provided with an output winding 26 having a central tap to which is connected the negative terminal of a "C" battery C2, the positive terminal of this battery being connected to the negative terminal of "B" battery B1 by means of conductor 27. The grids of relays R3 and R4 are connected to the terminals of winding 26, while the plates are connected to a common conductor 28 which is attached to the positive terminal of "B" battery B1. The negative terminal of this "B" battery connects to the filament of relays R1 and R2. The filaments of relays R3 and R4 are energized by means of "A" batteries 29 and 30 and are connected to conductors 6 and 8 in series with "B" batteries B2 and B3, the negative terminals of these "B" batteries being connected to the filaments.

The operation of the electrical distributor described above may best be understood by referring to the mechanical analogy shown in Fig. 2. Suppose for example that there is provided a mechanical distributor having four segments S1 to S4 which are contacted by a rotary brush 31. This distributor is associated with an electrical circuit including the separate electrical devices D1 to D4 inclusive, which are successively energized as the brush 31 contacts with the different segments. In Fig. 3, I have shown a sine wave A plotted together with its second harmonic A2. The intersection of curve A2 with the horizontal axis divides the same into four sections corresponding by way of analogy to the four distributor sectors S1 to S4 inclusive. For the first section it will be noted that both curves A and A2 are positive, for the second that curve A is positive while curve A2 is negative, for the third that curve A2 is positive and curve A is negative and for the last section that both curves are negative. Therefore for each section curves A and A2 bear a separate and distinct relationship to each other so that by controlling suitable apparatus in response to the separate conditions, the rotary brush may be dispensed with for successively energizing the segments S1 to S4 inclusive. This is exactly what happens in the system shown in Fig. 1, that is; the relays R1 to R4 vary the impedance of conductors 5 to 8 inclusive, responsive to the relationship between the fundamental and first harmonic currents at different time intervals.

The manner in which the system of Fig. 1 operates is as follows;—the "C" batteries C1 and C2 are adjusted so that the grids of the relays are made sufficiently negative to reduce the normal plate currents to substantially zero. In other words the normal plate filament impedance of the relays is made to normally assume an infinite value. The windings 21 and 26 of filters F2 and F1 are also considered to be in such a direction that during positive portions of their respective exciting cycles, the grids of relays R1 and R3 will become less negative or more positive. Likewise when the portions of the exciting cycles of filters F2 and F1 are both negative then the grids of relays R2 and R4 will become less negative or more positive and the grids of relays R1 and R3 will become more negative. Therefore during the first section of cycles A and A2 indicated in Fig. 3, the grids of relays R1 and R3 become less negative while grids of relays R2 and R4 will become more negative. Therefore the plate filament impedance of relay R1 and that of relay R3 assume a finite value while the impedance relays R2 and R4 assume infinite value. A circuit is thereby established which includes "B" batteries B1 and B2 and also the electrical element 1. This circuit may be traced as follows:—from "B" battery B1 through relay R3, battery B2, electrical element 1, rectifier 11, relay R1, and back through the negative terminal of battery B1. The rectifiers 12, 13 and 14 will prevent a current flow through elements 2, 3 and 4 while element 1 is being excited. During the second quarter of the fundamental cycle corresponding to the second half of the harmonic cycle, the direction of current flow through winding 21 has reversed so that the grid of relay R1 becomes more negative while the grid of relay R2 becomes positive or less negative. The current flow through winding 26 however remains the same as during the first quarter so that the plate filament impedance of relay R3 still maintains a finite value while the impedance of relay R1 maintains an infinite value. The reversal of current through winding 21 therefore causes the plate filament impedance of relay R2 to assume a finite value while that of relay R1 assumes infinite value. Another electrical circuit is thereby established which causes the energization of electrical element 2 to the exclusion of the other elements. This circuit may be traced from the battery B1 through relay R3, battery B2, electrical element 2, rectifier 12, conductor 7, relay R2, and back to the negative terminal of battery B1. While the valve 12 permits current to pass through element 2, the other valves 11, 13 and 14 exclude the current from flowing through the other elements. During the third quarter of the fundamental cycle, the current flow through winding 21 has reversed while the current flow through winding 26 again assumes the same direction as in the first quarter. Therefore the grid of relay R4 becomes less negative or positive and the grid of relay R3 becomes more negative, so that the plate filament impedance of relay R4 assumes a finite value while that of relay R3 becomes infinite. Likewise the grid of relay R1 assumes finite value while that of relay R2 becomes infinite. The result is that electrical element 3 is energized by being included in a circuit which may be traced from battery B1 through relay R4, battery B3, conductor 8, element 3, valve 13, conductor 5, relay R1, and then back to the negative terminal of battery B1. During the last quarter both cycles assume a negative value so that the current flow through both windings 21 and 26 is in a direction opposite to that during the first quarter. Therefore the plate filament impedances of relays R2 and R4 will assume finite values while the impedances of relays R1 and R3 will assume infinite values, with the result that electrical element 4 will be energized. The last circuit for energizing element 4 is traced from battery B1, conductor 28 through relay R4, battery B3, conductor 8, element 4, valve 14, conductor 7, relay R2 and thence back to the negative terminal of battery B1. Thus during one cycle of the fundamental current and two cycles of the harmonic, the elements 1, 2, 3 and 4 are separately and successively energized. The rate with which this energization takes place depends upon the frequency of the fundamental and harmonic currents. The rate of energization may be made relatively slow with-in audibility or may be made so rapid so as to be well above audition. For audible frequencies the harmonic generator 16 may consist of mechanical generators driven in synchronism, and for frequencies above audibility I prefer to employ oscillation generators of the vacuum tube type.

Instead of having the terminals of the electrical elements connected together as shown in Fig. 1, it is obvious that they may be related as indicated in Fig. 4. In this case one terminal of each of the elements is connected to a common conductor 32 while the other terminals are connected to the single conductors 33, 34, 35 and 36. By keeping the impedance of conductor 32 finite and causing the other conductors to successively assume finite values, as by means of the control devices 37 and 38 corresponding generally to the relays as shown in Fig. 1, the electrical elements may be successively energized.

It is obvious that by increasing the number of harmonic currents and the number of controlling relays, a greater number of electrical elements may be successively energized. For example a greater number of elements may be successively energized by using the fundamental, the second harmonic and the fourth harmonic.

There are many practical uses for an electrical distributor of this kind. For example it may be employed to discriminate between the impulses transmitted for a five or six impulse telegraph code, such as is employed for the operation of automatic telegraph printers. It may also be used for producing a rotating magnetic field, which because of the absence of mechanical parts, may be caused to rotate at a speed which has never before been attained by electrical equipment. Another use for the device, and one which I have specifically described in this application, is for multiplex signaling systems. In this case the successive energization of the electrical elements is employed for assigning definite time intervals for the operation of each signal channel. Since the elements may be energized at a rate well above audibility, such a multiplex signaling system may be utilized for telephonic as well as telegraphic signals.

In Fig. 5 there has been shown a signaling system incorporating the electrical distributor described above. This system has been illustrated in its simplest form and comprises only four signal channels which may be utilized for either telegraphy or telephony. A complete system has been shown for two way transmission and reception of signals, the signal being transmitted being distinguished from those being received by a difference in wave length. In this case the electrical elements 1, 2, 3, and 4 constitute the primary windings of coupler transformers K1 to K4 respectively. The transmitting part of this system includes a plurality of modulating devices M1 to M4 inclusive which have been shown in this instance as being ordinary microphone or telephone transmitters. These modulators are associated with a common electrical circuit including "B" battery 41, and the audible frequency modulations produced in this circuit by operation of any one of modulators is adapted to transmit corresponding modulations to a remote receiver. The modulations may be transmitted direct by wires or by means of a carrier frequency which is modulated by the audible frequency. For example a conventional carrier current transmitting system has been shown as comprising an amplifier 42 which is coupled to the modulator circuit as by means of a resistance 43. The output of amplifier 42 serves to modulate the carrier frequency of oscillator 44 as by means of modulator 46. The modulated output may again be passed through an amplifier 47 and then placed upon wires or radiated into a radio antenna 48.

The modulators are successively placed in operable condition to modulate the transmitted carrier frequency, in response to successive energization of the elements 1 to 4 inclusive. This result has been accomplished by utilizing a plurality of relays R11, R12, R13 and R14 which normally assume infinite values of impedance but which are caused to successively assume finite values if impedances as controlled by the successive energization of the electrical elements one to four inclusive. These relays are shown as of the conventional three element type having their filaments suitably energized as by means of a common "A" battery 49. The plate of each relay is connected respectively to one terminal of each of the modulators M1 to M4 respectively. The grids of the relays are connected respectively to the secondaries of transformers K1 to K4 respectively through the use of conductors 51 to 54 respectively. The other terminals of the transformer secondaries are connected to a common return conductor 56 which is connected to one side of the filaments of these relays. Conductor 56 is connected in series with a "C" battery 57 which serves to maintain the grids under a negative bias to normally keep their plate filament impedances substantially infinite. Battery 41 has its positive terminal connected to the other terminals of modulators M1 to M4 by means of a common conductor 48. The resistance 43 is of course included in the plate circuit of each relay, as one side of this resistance is shown as connected to the filament circuit.

The secondaries of transformers K1 to K4 are wound in such a direction that when energized by an impulse in the primary windings, the grid of the relays with which they are associated becomes negative or positive and the plate filament impedance of that relay becomes finite. For example assuming that electrical element 1 is being energized, the secondary of transformer K1 causes the potential upon the grid of relay R11 to become positive so that the plate filament impedance of this relay assumes a finite value. As a result the modulator M1 is operably placed in the modulating circuit which may be traced as follows:—from the "B" battery 41, through modulator M1, through the relay R11 and through resistance 43 back to the negative terminal of battery 41. Due to the successive energization of these electrical elements, the modulators will be successively placed in operable condition to modulate the transmitted carrier frequency.

If it is desired to simultaneously receive signals being transmitted from a remote station equipped with a system similar to that described above, a receiving system may be provided which comprises a plurality of translating devices adapted to be successively energized in accordance with successive excitation of the transmitters at the transmission station. To illustrate such a receiving system in its simplest form there is shown a plurality of telephone receivers or other translating devices T1, T2, T3, and T4 which are adapted to be successively placed in operable condition to translate received impulses.

In timing the impulses received by the translators, I have made use of the same electrical distributor employed for timing operation of the transmitting modulators, although it is obvious that in case a separate receiving system is employed without the corresponding transmitter, a separate electrical distributor may also be employed which is synchronized with the distributor at the transmitting station. In this particular instance the translators are controlled by a plurality of electron relays R21 to R24 which are similar in operation to the relay R11 to R14 previously described. The circuit with which the translators are successively placed in operative relationship includes the "B" battery 59, the positive terminal of which is connected to conductor 60, to which conductor one terminal of each translator is connected. The other terminal of each translator is connected to the plate of its associated relay. The grids of relays R21 to R24 are connected to the secondary terminals of transformers K1 to K4 inclusive through the use of conductors 61 to 64 inclusive. The filaments of these relays are preferably energized from a common circuit which includes the "A" battery 66. The grid circuits of the respective relays are completed by the use of a conductor 67 which is connected in common to the other terminals of transformers K1 to K4 inclusive. Conductor 67 is connected to the common filament circuit in series with a suitable "C" battery 68 whereby the grids of these relays are maintained under a negative bias sufficient to make the plate filament impedance of each relay normally substantially infinite.

Assuming that the signals being received are transmitted from an apparatus similar to that described above, the receiving system may include an antenna 71 which is coupled to a suitable detector 72. The output of detector 72 is passed through a suitable amplifier 73, the stages of which are resistively coupled together for a reason which will be presently apparent. The output of amplifier 73 is then coupled to the input of a modulator tube 74, as by means of resistance 76. The modulator tube 74 is of the usual three element electron relay type and includes the "B" battery 59 in its plate circuit. In series with the "B" battery 59 there is a relatively high impedance 77 so that the combined potential across battery 59 and impedance 77 in series, when a substantial plate current is flowing through modulator 74, is sufficiently low that practically no current will flow through the translator circuit. In practice the grid of modulator 74 is positively biased as by means of a "C" battery 78 so that the normal plate current is sufficient to reduce the effective potential of battery 59 as explained above. However the integrated signals impressed by amplifier 73 upon the input of modulator 74 serve to make the grid of modulator less positive and thus to reduce the plate current to cause a substantial increase in the effective potential of battery 59 with respect to the translator circuit. The object of this arrangement is to provide convenient means for modulating the plate currents of relays R21—R24.

In order to synchronize the transmitted and received impulses, means is provided for synchronizing the harmonic generator 16 with the harmonic generator at the other station. One suitable means for performing this result comprises a filter 79 which receives energy from the detector or amplifier 73 and which is tuned to the same frequency as the rate with which the impulses are being transmitted from the other station. The output of this filter is passed through an amplifier 81 and through the sub-harmonic generator 82 where a sub-harmonic of the filter frequency is produced which corresponds to the harmonic frequency of generator 16. This sub-harmonic however is 90 degrees out of phase with the harmonic of generator 16. Therefore it is passed through a phase changer 83 and is then impressed upon generator 16 to govern the frequency of the same.

In operating a system such as I have described, the electrical distributor serves to assign definite time intervals for the transmission of signals by means of any one of the separate channels represented by the modulators M1 to M4. Likewise the signals which are being received upon separate channels may be discriminated by successively placing the translators in operable condition to translate the received impulses. Since each impulse is relatively short in duration, it will be apparent that an audible frequency modulation being transmitted over any one channel, is reproduced at the receiving end by the summation of integration of a plurality of impulses. Therefore for the purpose of integrating the received impulses for each channel, the translators have been shown as shunted by condenser 84. To trace through the transmission and reception of signals between two remote stations, it will be presumed that the distributors at each station are synchronized and that for an instant elements 1 at each station are being energized. At each station relays R11 are made to assume finite values of impedance and modulators M1 are made operative to modulate the transmitted carrier frequency. At the same time relays R21 at each station are made to assume finite values of impedance so that translator T4 is made operative to receive an impulse. Presuming that the impulse is received by antenna 71, it is integrated by detector 72, amplified and impressed upon the input of modulator tube 74. Since modulator tube 74 is arranged to act inversely, this impulse will cause the grid of modulator tube to become less positive so as to decrease the normal plate current, and correspondingly to increase the current flowing to translator T4. In practice if two stations are both equipped with transmitting and receiving systems, translation in one direction is upon a different wave length than translation in the opposite direction.

Figure 6:
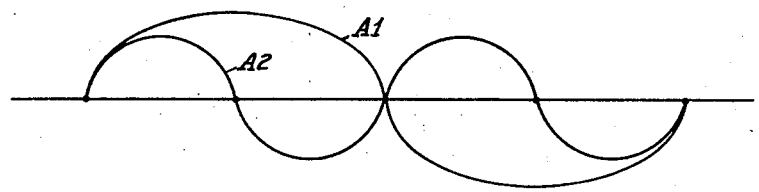
Figure 7:
Figure 8:
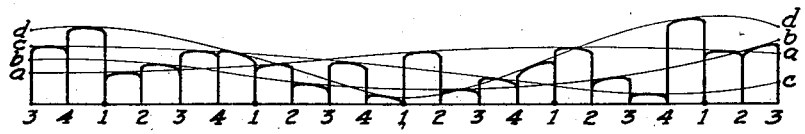
Figure 9:
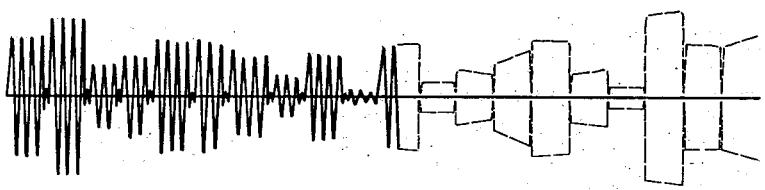
Figure 10:
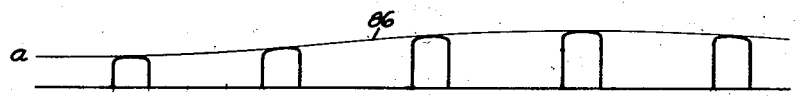
Figure 11:
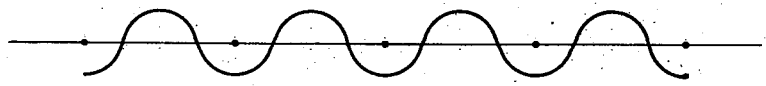
Figure 12:
Figure 13:
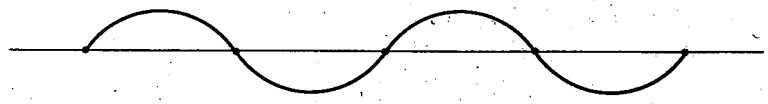

The operation of this system may be clarified by reference to the curves shown in Figs. 6 to 13 inclusive. In Fig. 6 the curves A1 and A2 correspond to the currents produced by the harmonic generator 16. The curve A2 of course represents the second harmonic of curve A1. The curve of Fig. 7 shows successive impulses as they are applied to the electrical elements 1 to 4 inclusive. Incidentally at this point it may be noted that the curve of Fig. 7 may be made to have flat even tops by the use of any one of a number of current limiting devices, or by operating certain of the relays R1 to R4 above the point of saturation. The curve of Fig. 8 is on a magnified scale and shows the successive impulses as they may be modulated by the four signal channels. Four separate modulating curves $a$, $b$, $c$ and $d$ are indicated, corresponding to a condition in which the four messages are being transmitted simultaneously. This curve shows clearly that a signal modulation is secured by the summation or integration of a number of successive spaced impulses. The curve of Fig. 9 shows the radio frequency oscillations of the transmitting oscillator after modulation by successive impulses such as indicated in Fig. 8. The curve of Fig. 10 indicates the received impulses for one signal channel which have been segregated from the other impulses, the impulses for one channel when integrated forming the modulation curve 86. The curve of Fig. 11 is drawn to substantially the same scale as Fig. 6 and indicates the output of filter 79 which is tuned to the frequency of the received impulses. Because of the inductive coupling employed the output of this filter assumes an approximate sine wave, which however, differs in phase from any one of the frequencies generated by the harmonic generator 16. The curve of Fig. 12 shows the sub-harmonic of the curve shown in Fig. 11, which is produced by passing the output of filter 79 through the sub-harmonic generator 82. Fig. 13 shows the current in the output of phase changer 83 which corresponds to the curve A2 of Fig. 6, and it is this current which when impressed upon harmonic generator 16, serves to synchronize this generator with the generator at the other station.

The multiplex system shown in Figs. 14A and 14B is similar to that described above but is provided with a greater number of multiplex channels. The number of effective channels has also been increased by the use of a novel modulating and translating network. In this case the fundamental, the second harmonic, fourth harmonic and eighth harmonic produced by the generator G16, are all utilized. The different frequencies are separated by the filter circuits F1, F2, F4 and F8. The relays R1, R2, R3 and R4 which are controlled by filters F8 and F4 respectively, operate to cause successive energization of the four transformers K1 to K4. The currents in filters F2 and F1 cooperate with corresponding relays R5, R6, R7 and R8 to control successive energization of transformers K11 to K14 inclusive. The current supplied to filter F1 is preferably amplified by one or more stages of an electron relay amplifier 93. The successive energization of the primary windings of transformers K11 to K14 is secured by means of the fundamental and the first harmonic frequency, while successive energization of the primaries of transformers K1 to K4 inclusive is secured by the fourth and eighth harmonic currents. In order to control the order with which the transformer primaries are energized, a polarity reversing switch 94 has been provided in the plate conductors for relays R1 and R2, and a similar reversing switch 95 has been provided for the filament conductors of relays R3 and R4. Likewise a polarity reversing switch 96 has been provided for relays R7, R8 and another such switch 97 provided for the relays R5 and R6.

In this system the modulators and translators have been grouped into networks from which any one individual modulator or translator may be selected. For example I have shown a translator network M which comprised telephone transmitters or other modulating devices numbered 103 to 118 inclusive. The translating network T likewise comprises a plurality of telephone receivers or other translating devices numbered 203 to 218 inclusive. Taking first the modulating network M, the modulators are arranged in a plurality of primary series by means of the horizontal conductors Y1 to Y4 inclusive. Other vertical conductors X1 to X4 inclusive intersect the vertical conductors and make it possible to select out any one individual modulator of the network. The individual modulators are each connected across the vertical and horizontal conductors adjacent the points of intersection of the same so that when one vertical and one horizontal conductor are included in an electrical circuit, one modulator is directly energized. To prevent leaking of current to other modulators when one modulator is selected out, the current to each modulator is limited to one direction as by the use of polarized relays, or preferably by the use of rectifiers or valves 99. The individual translators are likewise divided into a plurality of primary groups by the horizontal conductors Y11 to Y14 inclusive and individual translators may be selected out of the network by vertical conductors XII to X14 inclusive. The individual translators are connected across the intersection of two conductors and in order to prevent leakage of current to other translators when selecting out one individual translator, each translator is preferably provided with a series rectifier or valve 100 in order to limit the current thereto in one direction. While integrating the pulsations applied to each translator, suitable reactance may be provided, such for example as a series inductive choke 101, and a shunt capacitance 102. For a reason later apparent, the conductors Y11 to Y14 are preferably formed as continuations of conductors Y1 to Y4 respectively.

The means for successively placing the modulators in operative condition to modulate the transmitted carrier frequency comprises a plurality of relays R31 to R34 inclusive, these relays being of the usual three element electronic type having their respective plates connected to the vertical conductors X1 to X4 in series with suitable "B" batteries 119. The respective grid circuits of relays R31 to R34 are energized by the secondary currents from transformers K1 to K4 in a manner similar to the system shown in Fig. 5. Thus conductors 121 to 124 have been shown as connecting the grids of relays R31 to R34 to the secondaries of transformers K1 to K4 respectively, the other terminals of the transformer secondaries being connected to the common filament return conductor 126, in series with which is the "C" battery 127.

Referring now to the translator network, communication between the vertical conductors X11 to X14 inclusive is secured by means of relays R41 to R44 respectively. Instead of controlling the grids of these relays directly from the secondaries of transformers K1 to K4, separate coupling means have been provided which are energized by the same impulses which energize transformers K1 to K4. Thus I have provided a separate set of transformers K1a to K4a having their primary windings connected in series with the primary windings of transformers K1 to K4 respectively. Conductors 131 to 134 serve to connect the grids of relays R41 to R44 to the secondaries of transformers K1a to K4a respectively. The other terminals of the transformer secondaries are connected to a common filament return conductor 128 in series with which is the "C" battery 130. The plates of relays R41 to R44 are connected respectively to the conductors X11 to X14 in series with "B" batteries 129.

The selection of horizontal conductors of both the networks is secured by means of a plurality of relays R51 to R54 which have their separate filament circuits connected respectively to conductors Y11 to Y14. The grid circuits of each of these relays is separately energized by the secondaries of transformers K11 to K14 respectively. Each grid circuit is also provided with a suitable "C" battery 136 whereby each grid is biased negatively. The plate of each relay R51 to R54 is connected to a common conductor 137 which connects to the filament circuit of relays R41 to R44 in series with "B" battery 138.

The transmitting apparatus associated with the modulators has been shown as being of the carrier wave type comprising conventionally an amplifier 141 for amplifying modulations, a modulator 142 in which the amplified modulations serve to modulate the carrier frequency of the oscillator 143, and another amplifier 144 for amplifying the modulation carrier frequency. The modulating carrier frequency may be transmitted over lines or other conductors or may be radiated from a suitable radio antenna 146. In order to prevent a phase displacement or distortion of the impulses which discriminate the signal channels, the stages of amplification provided in the transmitting apparatus are preferably coupled by resistances. One of the input leads to amplifier 141 is connected to the filament return conductor 126 for relays R31 to R34, while the other is connected to the conductor 137 for relays R51 to R54, by means of conductor 147. A suitable "B" battery 148 is connected in series with conductor 147. A resistive element 149 may be shunted across the input terminals of amplifier 141 to complete the circuit for "B" battery 148. The receiving apparatus which is associated with the translators preferably includes a detector 151 which is connected to a suitable source of energy such as a radio antenna 152. The output of this detector is passed through one or more stages of resistance coupled amplifiers 150 and the output terminals from this amplifier which have been designated 153, and 154, are impressed upon the input of the modulator tube 156. This modulator is similar to the modulator tube 74 described with respect to Fig. 5 and is likewise adjusted to operate inversely, that is to have its grid made less positive or negative in response to the reception of signal energy. Accordingly the plate circuit of this tube has been connected to include the "B" batteries 138, in series with a relatively high impedance 157. The input or grid circuit is coupled to the output of amplifier 150 as by means of resistance 159, a suitable blocking condenser 160, being employed in series with conductor 154.

With the circuit arrangement as described above, it will be noted that one distributor is controlled by the fourth and eighth harmonic while the other distributor is controlled by the fundamental and second harmonic. Therefore the successive energization of transformer primaries K1 to K4 occurs at four times the rate of energization of transformer primaries K11 to K14. In other words each of the elements K11 to K14 will be energized four times as long as one of the transformers K1 to K4. In practice for a purpose later to be explained, it is preferable to modulate the impulse in each of the transformers K11 to K14 in accordance with the impulses produced in transformers K1 to K4. Stated in another way it is desirable to divide the exciting impulses of each of the transformers K11 to K14 into four separate impulses. This result can be accomplished by coupling the grid circuits of certain of the relays in the second distributor, with certain of the plate circuits of the first distributor. For example there is shown an inductance 162 which is connected in series with the plate circuits of relays R3 and R4. The inductance 162 is coupled to another inductance 163 which in turn is included in the grid circuits of relays R5 and R6 by means of conductors 164 and 166. The rectifier or valve 167 is inserted in series with inductance 163 for limiting the current flow therethrough in one direction, thus preventing modulation by means of an inductive "kick".

For synchronizing the harmonic generator G16 with the harmonic generator of another station whose signals are being received, there is provided a tuned filter 168 which receives a portion of the energy from detector 151. This filter 168 is tuned to a frequency corresponding to the rate with which modulating impulses are being received from the transmitter. In other words it is tuned to a frequency corresponding to the rate with which the separate electrical elements of the distributor located at the other station, are being energized. The energy from the filter 168 is amplified in one or more amplifier stages 169 and the amplified energy is then passed through a sub-harmonic generator 170. The desired sub-harmonic of this generator which corresponds to one of the original harmonic frequencies is then passed through the suitable phase changer 171 and impressed upon the harmonic generator G16 to govern the frequency of the same. One particular form of harmonic generator has been shown conventionally and comprises an electron relay 173 having grid and plate inductances 174 and 176 which are mutually coupled together to a common output inductance 177. The sub-harmonic is impressed upon generator G16 through coupling inductance 178, and corresponds in frequency to one of the frequencies being generated.

In describing the operation of this system it will be presumed that it is in communication with another similar system and that signals are being received and transmitted upon different wave lengths. The grids of relays R31 to R34, R41 to R44, and R51 to R54 are all biased negatively so that their respective plate filament impedances are substantially infinite. The operation of each of the two distributors is substantially the same as that previously described with respect to Fig. 1. However relays R5 to R8 are preferably operated above saturation so that the modulated impulses produced in the transformers K11 to K14 will all be of substantially the same magnitude. The windings of each of the transformers K1 to K4, and K1a to K4a are all arranged so that when energized by an impulse by the first distributor, they will place a positive potential upon the grids of certain of the relays R31 to R34, R41 to R44. Likewise the secondaries of transformers K11 to K14 are arranged so that when their primaries are energized, the induced secondary current tends to make the grids of relays R51 to R54 positive.

In tracing through the operation of the system it will be presumed that the first distributor is causing the energization of the primary of transformer K1, and that distributor 2 is effecting energization of transformer K11. The secondary of transformer K1 causes a positive potential to be placed upon the grid of relay R31 which therefore reduces the plate filament impedance of this relay to a finite value. Transformer K1a is also energized so that its secondary places a positive potential upon relay R41 to render the plate filament impedance of this relay finite. At the same instant the secondary of transformer K11 causes a positive potential to be placed upon the grid of relay R51 so that circuits are established which energize the modulator 111 and translator 211. The energizing circuits for modulator 111 may be traced as follows:—from "B" battery 148, conductor 147, relay R51, conductor Y11, conductor Y1, modulator 111 and its associated rectifier, conductor X1, relay R31, filament return conductor 126, and thence back to the negative terminal of battery 127 through resistance 149. For the translating circuit 211, the energizing circuit may be traced from battery 138, impedance 157, relay R51, translator 211 and its associated rectifier, conductor X11, relay R41 and its associated "B" battery 129, and thence back through the negative terminal of "B" battery 138. The received impulse which is synchronized with the impulses controlling relays R31, R41 and R51 is impressed upon the input of modulator 156 and effects this modulator inversely to increase the effective potential produced by battery 138. The magnitude of the change in the effective potential of battery 138 determines the nature of the response in the translator 211. If the modulator 111 is actuated as by voice frequencies during this instant, its modulations are directly impressed upon the oscillator 143 by the circuit previously traced.

It will now be presumed that the first distributor causes transformer K1 to be de-energized and transformer K2 to be energized. In the second distributor however transformer K11 is again energized by an impulse similar to the first impulse and the other transformers of that distributor remain de-energized. Relays R31 and R41 have now assumed an infinite value while relays R32 and R42 have had their grids made positive by impulses produced in the secondaries of transformers K2 and K2—a. The result is that a new modulator circuit is formed which includes the modulator 112, and correspondingly another translator circuit is established which includes the translator 212. The circuit which includes modulator 112 may be traced from battery 148, conductor 147, relay R51, conductor Y11, conductor Y1, modulator 112 and its associated rectifier, conductor X2, relay R32, and its associated "B" battery 119, filament return conductor 126, and thus back to the negative terminal of battery 148 through resistance 149. The circuit for translator 212 may be traced from battery 138, impedance 157, conductor 137, relay R51, translator 212 and its associated rectifier, conductor X12, relay R42 and thence back to the negative terminal of "B" battery 138. At this instance modulator 112 is effective to modulate the output of the transmitter while translator 212 is operable to translate an impulse received through modulator 156. During the next impulse or third impulse produced by distributor 1, transformers K3 and K3—a are energized while transformer K11 continues to be energized for the third successive time by distributor 2. By means of circuits similar to those previously traced for the modulators and translators 111 and 112, the modulator 113 is now operable to modulate the output of the transmitter while translator 213 is operable to translate a received impulse. Likewise when transformers K4 and K4—a are energized by distributor and transformer K11 is energized by its fourth successive impulse, modulator 114 is effective to modulate the transmitter while translator 214 is operable to translate a received impulse. During this cycle of operation it will be noted that relay R51 by virtue of distributor 2 has selected out one group or series of modulators and translators from which individual members are selected by operation of the first distributors.

During the beginning of the next cycle of operation transformers K1 and K1a are again energized while transformer K12 of the second distributor is now energized. The de-energization of transformer K11 causes relay R51 to now assume an infinite value while the impedance of relay R52 assumes a finite value because of the positive charge placed upon its grid by transformer K12. A new series of modulators and translators have now been selected out by operation of the second distributor, and energization of transformers K1 and K1a cause the individual modulator 115, and the indvidual translator 215 to be selected out from the series. After all of the modulators and translators in this next series have been individually selected out during successive energization of transformers K1 to K4 and transformers K1a to K4a, then a new series is selected by energization of transformer K13. It is obvious from the above description that in the complete operation of the system each of the modulators of the network are in turn placed in operating condition to modulate the transmitter and that each one of the translators is correspondingly placed in condition to translate a received impulse. When communication is established in both directions between two stations, one signal channel may be assigned to a definite modulator while one of the signal channels being received may be assigned to a certain translator. One modulator and one translator may then form a unit for simultaneous communication between the two stations. Cross talk between a modulator and its associated translator may be minimized by operating relays R51—R54 above saturation so that modulations in the modulator circuit will not cause corresponding modulations in the modulator circuit will not cause corresponding modulations in a local translator circuit. In practice the rate with which the impulses are received by modulators and translators is above audibility so that the transmission and reception of the frequencies is practical. The successive received impulses received by any one translator are integrated to give a response corresponding to the original modulation by means of the choke 101 and condenser 102. The order with which the translators and modulators are made operable may be controlled by the position of reversing switches 94 to 97.

It is obvious that an unlimited number of channels may be produced by the system as described above. For example by employing four distributors instead of two, a total of 256 signal channels is available, and all of these channels are transmitted upon one carrier frequency.

A number of different electrical arrangements may be utilized for integrating the impulses received by any one translator. For example in Fig. 15, I have shown the use of a vacuum tube detector. Thus there is provided a transformer 181 whose primary is connected across the conductors Y14 and X13, in series with the rectifier or valve 182. The secondary of this transformer is connected to the grid circuit of a detector tube 183, whose output supplies the telephone receiver or translator 184.

Instead of connecting conductors Y1 to Y4 to conductors Y11 to Y14, I may separately control the currents in conductors Y1 to Y4 by a separate series of relays in addition to relays R51 to R54. These additional relays may have their grids connected to transformers included in series with transformers K11 to K14. However the arrangement shown is preferable from the standpoint of simplicity.

A slightly modified form of signaling system is shown in Figs. 16 and 17, Fig. 16 showing the circuit connections for the transmitter and Fig. 17 the circuit for the receiver. This system is especially designed for broadcast transmission to a plurality of receivers, any one of which may be adjusted to receive signals upon any one of the transmitted signal channels. The signaling system shown in Fig. 16 is almost identical to that shown in Fig. 5 with the exception that the receiving translators and the synchronizing elements have been omitted. The electrical distributor effects successive energization of transformers K1 to K4 which cause the modulators M1 to M4 to be successively placed in operative condition to modulate the transmitted carrier frequency. The receiver is arranged so that it can receive only one signal channel at a time but is provided with a selector switch whereby it can select any signal channel desired. This receiver comprises for example detector tube 186 having its grid circuit coupled to a source of modulated energy such as the radio antenna 187. The output of detector 186 is energized from a suitable source of energy such as the "B" battery 188 in series with the impedance 189. A suitable source of harmonic currents, which are similar to the currents produced by the harmonic generator 16, is indicated at 179 and serves to supply currents to the tuned coupling transformers 180 and 185, these transformers being tuned to substantially the same frequencies as the filters F1 and F2 of the transmitting system shown in Fig. 16. Associated with the output circuit of detector 186, there is a translator circuit which preferably includes the telephone receivers or other form of translator 184, and a relay 190 which is controlled by the harmonic currents produced by the generator 179. This relay is preferably of the four element type having two control elements or grids 191 and 192. The plate filament impedance of relay 190 is arranged to place the translator 184 in operable relation to translate the received impulse, depending upon whether the plate filament impedance is finite or infinite. For simplicity therefore the plate filament path of relay 190 may be connected in series with phones 184 and across "B" battery 188 and impedance 189. With a relay of this type having two grids, no current flow will occur between the plate and filament if either one or both of the grids are biased negatively, but if both grids are given a positive charge then the plate filament impedance becomes finite. In practice the charge upon grids 191 and 192 is controlled by the harmonic currents in transformers 180 and 185. These coupling transformers have secondary windings 193 and 194 which are centrally tapped, and these central taps are connected to the filament of relay 190 by means of conductors 195 and 196. "C" batteries 197 and 198 are included in series with conductors 195 and 196. A suitable switch mechanism 199 is provided so that the grids 191 and 192 may be connected across any two of the terminals of windings 193 and 194. For convenience this switch is preferably a rotary device including a rotatable arm 221 carrying the separate brushes 222 and 223 which are connected to grids 191 and 192 respectively. Associated with the terminals of winding 193 are a pair of conductor segments 224 and 225 which are adapted to be contacted by brush 222. Another series of segments 226, 227, 228 and 229 are adapted to be contacted by brush 223, and these latter segments are alternately connected to the terminals of winding 194. For example segment 226 and segment 228 are connected together and to one terminal of winding 194 by means of conductor 231 and segments 227 and 229 are connected together and to the other terminal of winding 194 by means of conductor 232. With a switch of this kind there are four different positions corresponding to the four signal channels. In one position of the switch which is shown in the drawings the grids 191 and 192 are connected by means of switch segments 226 and 224, to the lower terminal of winding 193 and the other grid to the lower terminal of winding 194. When the switch is turned to contact the brushes with segments 227 and 225 the grids are connected respectively to the upper terminal of winding 192 and to the upper terminal of winding 194. In the third position the connections are to the upper terminal of winding 192 and to the lower terminal of winding 194. In the fourth position the connections are to the lower terminal of windings 192 and the upper terminal of winding 194.

In order to synchronize this receiver with the transmitter shown in Fig. 16, I have shown the use of means for diverting a portion of the received energy to control the frequency of the harmonic generator 179. For example there is conventionally shown an amplifier 233 having its input coupled to the output of detector 186, as by means of an impedance 234, and tuned to a frequency corresponding to the rate with which the distributed impulses are being transmitted. The output of amplifier 233, supplies a sub-harmonic generator 235 and a sub-harmonic of the frequency supplied by amplifier 233 is then passed through the phase changer 236 after which it is impressed upon the harmonic generator 179, in a manner similar to the synchronizing means previously described with respect to Figs. 14—A and 14—B.

In operating this latter system described with respect to Figs. 16 and 17, it is to be understood that a plurality of receivers may be employed for simultaneously receiving signals broadcast from one transmitter. By rotating the switch 199 any one of these receivers may receive signals upon any one of the signal channels being transmitted. In case it is desired to receive signals on more than four signal channels, it is obvious that the receiver may be readily modified by utilizing a harmonic generator which will produce more than two currents having a harmonic relationship to each other, and by employing a switch having a greater number of segments. The idea of employing a relay 190 having two grids, is principally for the purpose of simplifying the receiver. It is obvious however that instead of employing such a relay, I may make use of two separate relays connected together so as to control the output of detector 186 by their combined effect.

In all of the signaling systems which I have disclosed, it will be noted that the harmonic generators at the different stations are synchronized by impressing upon the local harmonic generator, a varying current derived from the received energy, this varying current corresponding to the frequency of one of the currents being produced by the generator. The use of a sub-harmonic generator has been shown to more clearly illustrate the invention, but its use is not essential. For example, referring to the system shown in Fig. 5, the sub-harmonic producer 82 may be omitted, and current from the phase changer 83,—which corresponds in this case to the second harmonic frequency of generator 16—, may be impressed directly upon generator 16 to govern the frequency of the same.

I claim:

1. In a multiplex signaling system, a plurality of electrical elements, means for effecting a timed distribution of current in said elements whereby they are energized successively, a modulating device for each element, signal transmitting means, an electrical circuit for associating each modulator with said transmitting means, and relay means responsive to the energization of each element for rendering a particular modulating device operable to modulate the transmitting means.

2. In a multiplex signaling system, a plurality of electrical elements, means for effecting a timed distribution of current in said elements whereby they are energized successively, a modulating device for each element, signal transmitting means, an electrical circuit for associating each modulator with said transmitting means, and relay means responsive to the energization of each element for varying the impedance of a particular circuit from an infinite to a finite value whereby at that instant one modulating device is operable to effect signal transmission.

3. In a multiplex signaling system, a plurality of electrical elements, means for effecting a timed distribution of current in said elements whereby they are energized successively, a receiver of signal energy, a translating device for each element, an electrical circuit for associating each translator with the receiver, and relay means responsive to the energization of each element for rendering a particular translating device operable to translate received signal energy.

4. In a multiplex signaling system, transmitting and receiving stations, the transmitting station comprising a plurality of electrical elements, means for effecting a timed distribution of current in said elements whereby they are energized successively, a modulating device for each element, signal transmitting means, an electrical circuit for associating each modulator with said transmitting means, means responsive to the energization of each element for rendering a particular modulating device operable to operate the transmitting means to effect a transmission of signal energy, the receiving station comprising means for receiving signal energy from the transmitting station, a plurality of electrical elements corresponding to the elements at the transmitting station, means for effecting a timed distribution of current in said elements in synchronism with the energization of the elements at the transmitting station, a translating device for each element, an electrical circuit for associating each element with said receiving means, and relay means responsive to the energization of each element for rendering a particular translating device operable to translate received signal energy.

5. In a system of the class described, a network of electrical devices, a plurality of conductors for connecting said devices into primary groups, another set of conductors for selecting single devices from any one of the primary groups, and means in series with each individual device for limiting current flow therethrough to one direction.

6. In a system of the class described, a network of electrical devices, a series of conductors for connecting said devices into primary groups, another series of conductors for selecting single devices from the primary groups, means associated with each individual device for limiting current flow therethrough to one direction, an external electrical circuit, and controllable means associated with each conductor whereby one conductor of each series may be operably connected to the external circuit.

7. In a multiplex signaling system, separate networks of modulating and translating devices, a series of conductors for connecting said modulators into primary groups, a second series of conductors for selecting single modulators from said primary groups, means associated with each modulator for limiting the current flow therethrough to one direction, a third series of conductors for connecting the translators into primary groups, a fourth series of conductors for selecting single translators from the primary translator groups, a signal transmitting system associated with the modulating network, said transmitting system having a number of multiplex channels corresponding to the number of modulators, a signal receiving system having an equal number of channels and means for associating the modulating and translating networks with said transmitting and receiving system whereby any one modulator is operable to transmit signals over a channel and a translator corresponding to each modulator is operable to receive a signal received on one channel.

8. In a multiplex signaling system, a signal transmitting system having a plurality of channels discriminated as to time periods, a receiving system having a plurality of channels discriminated as to time periods, the channels of the received signals being discriminated from the transmitted channels by frequency, a plurality of modulators, a corresponding number of translators, and means for assigning a transmitting and a receiving channel to one modulator and translator respectively whereby signals may be simultaneously transmitted and received.

9. In a multiplex signaling system, receiving apparatus adapted to translate signal energy separated into a plurality of channels by time discrimination, said apparatus comprising means for detecting received energy, a translator, a circuit for supplying energy to the translator from the detecting means, a relay inserted in said circuit for varying the impedance of the same between finite and infinite limits, means including currents bearing a harmonic relationship to each other for controlling said relay whereby said circuit is made to assume a finite impedance value corresponding to the timing of one signal channel, and means for changing the polarity of the harmonic currents whereby said translator may be selectively employed to translate signals of any one channel.

10. In a multiplex carrier wave signaling system, a carrier wave transmitting system having a plurality of channels discriminated as to time periods, a carrier wave receiving system having a plurality of channels discriminated as to time periods, the channels of the received signals being discriminated from the transmitting channels by frequency, a plurality of modulators, a corresponding number of translators, and means for assigning a transmitting and receiving channel to one modulator and translator respectively whereby modulated carrier wave signals may be simultaneously transmitted and received.

11. In a method characterized by the use of an electrical circuit and an electron relay included therein, said relay having anode and cathode elements connected to the circuit and also having two control elements; said method comprising rendering the anode cathode impedance of the relay finite only for definite time spaced periodic intervals by impressing current impulses upon each of said control elements bearing a harmonic relationship to each other.

12. In a multiplex signaling system, receiving apparatus adapted to translate signal energy separated into a plurality of channels by time discrimination, said apparatus comprising means for detecting received energy, a translator, a circuit for supplying energy to the translator from the detecting means, an electron relay including an anode, a cathode and two control elements, said anode and cathode being included in said circuit, a source of currents bearing a definite harmonic relationship to each other, and a selector switch serving to control application of said currents to the control elements of said relay.

HAROLD B. COYLE.